United States Patent [19]
Breaux et al.

[11] Patent Number: 5,067,510
[45] Date of Patent: Nov. 26, 1991

[54] ADJUSTABLE, FUSIBLE, MANUALLY OPERABLE VALVE LOCK-OPEN ASSEMBLY

[75] Inventors: Craig B. Breaux, Houma; Denny Cawyer, Metairie; Dwight Duplantis, Houma; Don Hiller, Slidell, all of La.

[73] Assignee: Axelson, Inc., Longview, Tex.

[21] Appl. No.: 654,066

[22] Filed: Feb. 11, 1991

[51] Int. Cl.$^5$ .................................. F16K 17/40
[52] U.S. Cl. ................................ 137/77; 137/75; 251/90; 251/113
[58] Field of Search ............... 137/77, 75, 72; 251/90, 251/113

[56] References Cited

U.S. PATENT DOCUMENTS

| | | | |
|---|---|---|---|
| 1,004,794 | 10/1911 | Keeton | 137/72 X |
| 1,497,946 | 6/1924 | Schmidt | 137/77 |
| 1,814,157 | 7/1931 | Heimbold | 137/77 |
| 1,914,250 | 6/1933 | Gillen | 137/77 |
| 1,991,052 | 2/1935 | Derby | 251/121 |
| 2,997,052 | 8/1961 | Mangini | 137/77 |
| 3,809,114 | 5/1974 | Mueller et al. | 137/315 |
| 3,838,705 | 10/1974 | Diehl et al. | 137/75 |
| 3,842,853 | 10/1974 | Kelly et al. | 137/75 |
| 3,842,854 | 10/1974 | Wicke | 137/77 |
| 3,896,835 | 7/1975 | Wicke | 137/75 |
| 3,958,592 | 5/1976 | Wells et al. | 137/77 X |
| 4,240,455 | 12/1980 | McGee | 137/77 |
| 4,245,662 | 1/1981 | McGee | 137/75 |
| 4,421,134 | 12/1983 | Bruton et al. | 137/77 X |
| 4,432,383 | 2/1984 | Boyette | 137/77 |
| 4,533,114 | 8/1985 | Cory et al. | 137/75 X |
| 4,619,434 | 10/1986 | Snyder et al. | 137/77 X |
| 4,635,670 | 1/1987 | Kilmoyer | 137/75 |
| 4,714,233 | 11/1987 | Oates | 137/75 X |
| 4,827,963 | 5/1989 | Baker et al. | 137/75 |

Primary Examiner—John Rivell
Attorney, Agent, or Firm—Jones, Day, Reavis & Pogue

[57] ABSTRACT

An actuator shaft heat-sensitive locking apparatus is disclosed comprising a cylindrical housing having an axial bore. A shaft link is provided in the bore and is adjustable to contact gate valve actuator shafts of varying lengths. Once adjusted, the shaft link is movable axially between a first position and a second position, allowing the actuator shaft to close the gate valve. There is also provided a means movably extending through the housing for partially blocking the bore and a fusible element slidably mounted in the bore between the shaft link and the means for partially blocking the bore. The fusible element has both a solid state and a heat responsive state. In its solid state, the fusible elemnt prevents movement of the shaft link by enaging the bore blocking means; in its heat responsive state, the fusible element allows movement of the shaft link between the first position and second position. A mechanical release means is also provided surrounding the housing for axial movement in operative relation with the bore blocking means for remote operation. The mechanical release means allows the shaft link to move with the fusible element between the first position and the second position.

19 Claims, 2 Drawing Sheets

ADJUSTABLE, FUSIBLE, MANUALLY OPERABLE VALVE LOCK-OPEN ASSEMBLY

FIELD OF THE INVENTION

The present invention is directed to an adapter assembly that can be connected to an existing conventional actuated wellhead gate valve and, more particularly, to a cap assembly to convert the valve to a heat-sensitive safety valve for wireline operations and the like and that can be remotely and manually released for normal operations.

BACKGROUND OF THE INVENTION

A wellhead is equipped with a gate valve in which a piston-like valve actuator biases the valve to the closed position by a spring acting against the lower surface of the actuator piston head. Pneumatic pressure engages the opposite surface of the piston to overcome the biasing spring and hold the valve in the open position. In the event of a well fire, pressure to the actuator is vented and valve body pressure, aided by the biasing spring, automatically shuts the valve, stopping flow of well fluids, thereby preventing an uncontrolled continuous flow of fuel to the fire.

Events causing loss of actuator pressure are not uncommon. Such an inadvertent loss which automatically closes the gate valve, at time, can be expensive, time-consuming and frustrating. One such time is during the performance of routine maintenance or well testing using conventional wireline techniques. A loss of actuator pressure closing the gate valve severs the wireline, dropping the tool being employed, along with several thousand feet of wireline, down the well. In addition to any damage that may occur to the tool, additional time and expense are incurred in fishing the wireline and tool out of the wellbore resulting in both the cost associated with the manhours of labor and the hours of lost well production.

In order to avoid such expensive fishing expeditions, it is a common practice to mechanically disable the biasing spring (i.e., to jam the actuator open) during wireline operations to guard against the possibility of an inadvertent valve closure. Such a practice is obviously unsafe and represents a significant gamble that a fire will not occur during the time when the valve is jammed open.

In response to customer reaction to this problem, valve manufacturers began manufacturing a "fusible lock-open device" that enabled the valve to be held open by a cap assembly over the end of the actuator shaft. This cap had a portion made of fusible material which, in the event of a fire, melted allowing the valve to close. While these modified valves solve the safety problem, they do not allow the valves to operate in their normal modes without removing the cap assembly. When special operations are needed or required, such as using a wireline to drop a tool down the well, the valve must be forced into the open position and then the cap assembly installed on the outside of the valve actuator to engage the actuator shaft. If the pressure is lost to the valve actuator, the cap assembly holds the valve open and provides the fire protection. When the operation is completed, the cap assembly must be removed for normal valve operation to resume.

Additionally, manufacturers of wellhead gate valves do not produce a standard length actuator shaft and, therefore, once the valve is open, the length of shaft protruding from the gate valve housing is not always the same. This requires a need for a retrofit cap assembly to be adjustable for various length actuator shafts.

Moreover, there are situations where a customer would want to close the wellhead valve before the fusible material melted, such as when a fire is anticipated. There occurs situations where closing the valve is needed quickly and preferably from a remote location.

It is, therefore, an object of the present invention to provide an improved fusible lock-open cap assembly for attachment to an actuated gate valve assembly to hold the valve in the stroked position.

Another object of the present invention is to provide a fusible lock-open cap assembly that is adjustable to fit with gate valves having various length actuator shafts.

It is a further object of the invention to provide a fusible lock-open cap assembly having a quick-release mechanical feature to enable the valve to operate in its normal mode without removing the cap assembly from the valve. It is a related object of the invention to provide a fusible lock-open cap assembly having the quick-release mechanical feature remotely operable in the event of an emergency.

SUMMARY OF THE INVENTION

A heat-sensitive, manually-operable lock-open apparatus is disclosed comprising a cylindrical housing having an axial bore. A shaft link is provided in the bore and is axially adjustable to make contact with the end of a variable length gate valve actuator shaft. Once adjusted to contact the gate valve actuator shaft, the shaft link is movable axially between a first position and a second position, allowing the actuator shaft to move the gate valve from its open to its closed position. There is also provided a means movably extending through the housing for partially blocking the bore and a fusible element slidably mounted in the bore between the shaft link and the means for partially blocking the bore. The fusible element has both a solid state and a heat responsive state. In its solid state, the fusible element prevents movement of the shaft link by engaging the bore blocking means; in its heat responsive state, the fusible element melts and allows movement of the shaft link between the first position and second position. A manually operated mechanical release means is also provided surrounding the housing for axial movement in operative relation with the bore blocking means to release the link and allow normal operation of the valve. The mechanical release means allows the shaft link to move with the fusible element between the first position and the second position, thus enabling the actuator shaft to move the gate valve between the open and closed positions.

BRIEF DESCRIPTION OF THE DRAWINGS

Further objects, features and advantages of the invention will be appreciated from the detailed descriptions of the preferred embodiment when taken in connection with the accompanying drawings in which.

DETAILED DESCRIPTION OF THE PREFERRED EMBODIMENT

Figure 1:
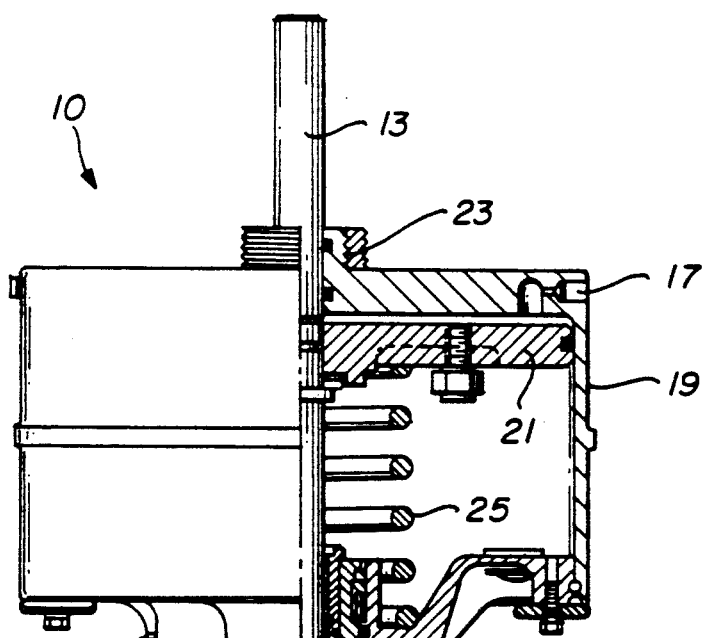
FIG. 1 is a cross-sectional, partially cut-away view of a wellhead gate valve and actuator according to the prior art.
Figure 1:
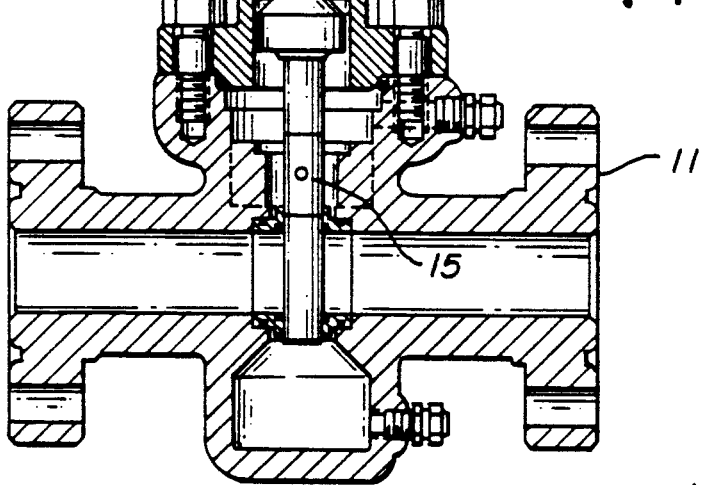

Referring to the drawings, there is shown in FIG. 1 an actuated wellhead valve 10 of the gate type according to convention in the art. Wellhead gate valve 10 has a valve body 11 receiving a gate 15. An actuator shaft 13 is coupled to the reverse acting fail-safe gate 15. During operation of gate valve 10, hydraulic or pneumatic control pressure is introduced at control pressure inlet 17, filling and expanding the space between the actuator housing 19 and the piston 21, thus moving actuator shaft 13 and positioning gate 15 into valve body 11 to open the valve and allow the flow of oil or gas through actuated wellhead gate valve 10.

As is also routine in the art, to provide a lock-open feature, actuator housing 19 is provided with a threaded connector 23. To maintain actuator shaft 13 in the operating position, a conventional cap assembly (not shown) having an internally threaded portion may be threaded on the actuator of the wellhead gate valve 10 via thread connector 23, to engage and thereby hold actuator shaft 13 in the open position in the event that control fluid pressure is relieved. Without such lock-open cap assembly, upon loss of control pressure, valve body pressure acting on lower end of shaft 13 and spring 25, biased to resist the force of control pressure, will bias piston 21, thus moving actuator shaft 13 to close the wellhead gate valve 10. With such lock-open cap, should a fire occur, the valve cannot be closed.

Figure 2:
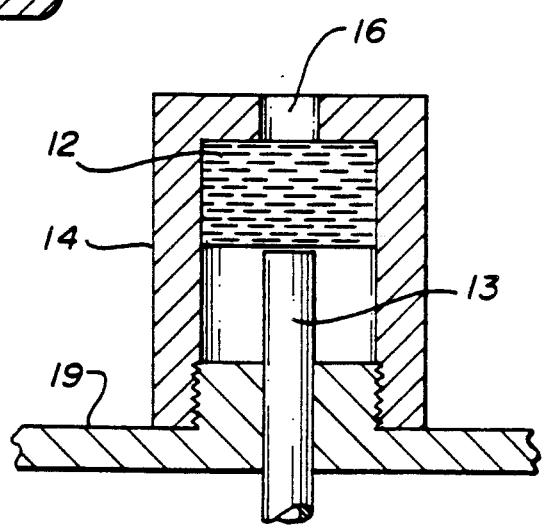
FIG. 2 is a cross-sectional schematic view of a prior art heat-sensitive lock-open device.

Lock-open caps such as that shown schematically in FIG. 2 have been developed which have a solid fusible element 12 in a cap 14 that is threadedly attached to the actuator housing 19. Cap 14 has an orifice 16 in the top thereof. The fusible element 12 contacts the end of shaft 13 when the valve is in the open position to hold the valve in its open position even if control pressure is removed. If, however, a fire occurs, fusible element 12 melts, thus allowing shaft 13 to be forced by biasing valve body pressure on shaft 13 and spring 25 through orifice 16 to move the valve gate 15 and close valve body 11. It will be seen that as soon as the event requiring the valve to be held open is concluded, the cap 14 must be removed from housing 19 so that the gate 15 can resume normal operations.

In accordance with the present invention, a heat-sensitive manually operable lock-open apparatus is disclosed comprising a cylindrical housing having an axial bore. A shaft link is provided in the bore and is adjustable to contact gate valve actuator shafts of various lengths. Once adjusted, the shaft link is movable axially between a first and a second position, allowing the actuator shaft to close the gate valve. There is also provided a means movably extending through the housing for partially blocking the bore and a fusible element slidably mounted in the bore between the shaft link and the means for partially blocking the bore. The fusible element has both a solid state and a heat responsive state. In its solid state, the fusible element prevents movement of the shaft link from its first position to its second position by engaging the bore blocking means; in its heat responsive state, the fusible element allows movement of the shaft link from the first position to the second position. A manually operated mechanical release means is also provided surrounding the housing for axial movement in operative relation with the bore blocking means for remote operation. The mechanical release means allows the fusible element to move with the shaft link between the first position and the second position.

Figure 3:
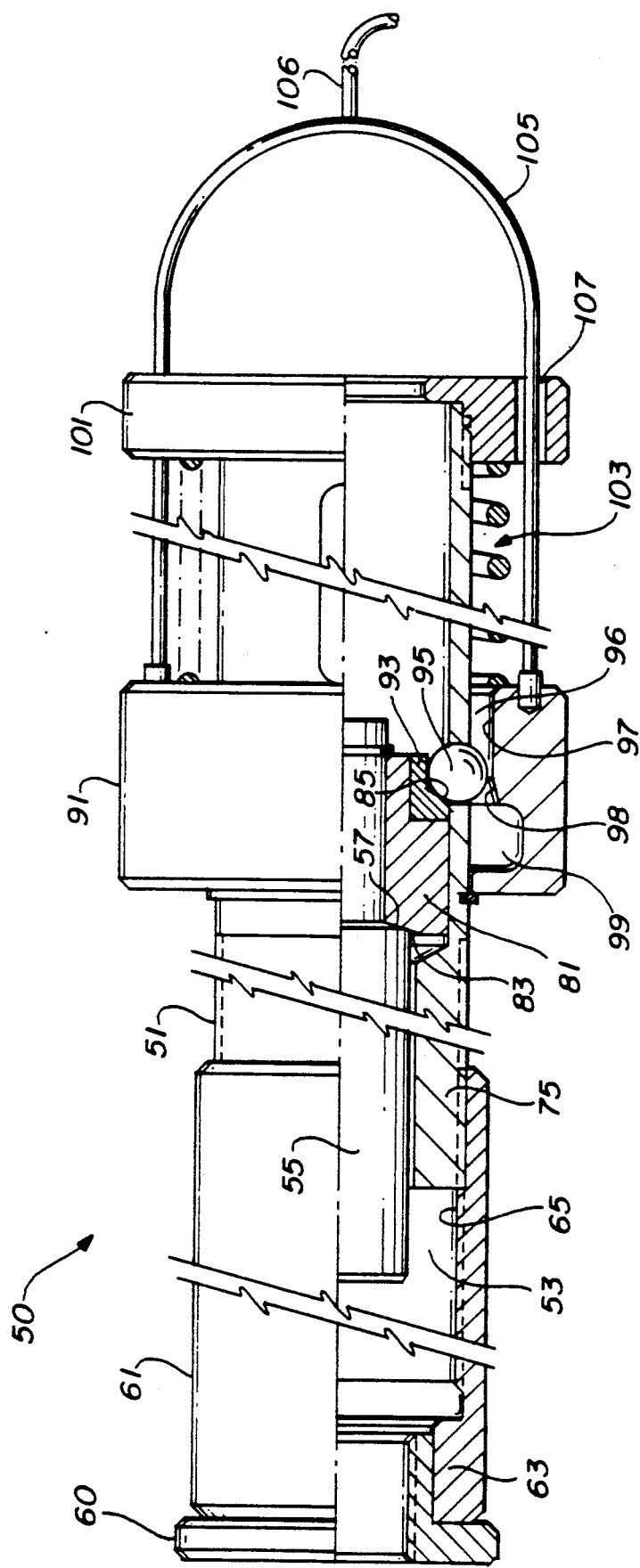
FIG. 3 is a partially cut-away view of an improved fusible lock-open cap assembly according to the present invention.

Turning now to FIG. 3, there is shown a manually-releasable lock-open cap assembly 50 according to the present invention. An important aspect of the present invention is the cap assembly's ability to adjust for use with actuated wellhead gate valves having differing length actuator shafts 13 extending from the actuator housing 19 of FIG. 2. To accomplish this adjustability, cap assembly 50 having a cylindrical body 51 is provided. The cylindrical body 51 forms a bore 53 in which is situated a shaft link 55. To lock actuator shaft 13 of FIG. 1 so that valve gate 15 is in its open position and also allow for actuator shaft 13 to move the gate 15 to its closed position, shaft link 55 of FIG. 3 is movable axially along the length of cylindrical body 51 within bore 53 between a first position and a second position. In the preferred embodiment, when shaft link 55 is in the first position, actuator shaft 13 in FIG. 1 of wellhead gate valve 10 holds gate 15 in the opened position and, when shaft link 55 is in the second position, wellhead gate valve 10 is closed.

In normal operation, shaft link 55 is in the first position and in fixed relation in bore 53 to cylindrical body 51. Accordingly, to provide for cap assembly adjustability with respect to the end of shaft 13, sleeve 61 is provided. Sleeve 61 has first internal threads 63 and second internal threads 65. Internal threads 63 are provided for assembly with actuated wellhead gate valve 10 via attachment with thread connector 23 on actuator housing 19. Alternatively, a bushing 60 allows connection to smaller threaded connectors 23. For telescopic relation between cylindrical body 51 and sleeve 61, external threads 75 are provided on cylindrical body 51 to engage internal threads 65 of sleeve 61. With reference to FIG. 3 and the preceding discussion of the relationship among the thread connector 23 on actuator housing 19, sleeve 61 and the cylindrical body 51, it can be appreciated that cylindrical body 51 may be threaded within sleeve 61 until the end of shaft link 55 abuts the end of actuator shaft 13. In this manner, an adjustable locking cap assembly is provided that may be fitted to any of a variety of gate valve assemblies having actuator shafts with different lengths protruding from housing 19.

In accordance with another important feature of the invention, upon loss of control pressure in actuated wellhead gate valve 10, fusible element 81 is provided to allow the shaft link 55 to move between its first position and its second position, and thereby allow the actuated wellhead gate valve 10 to go from an open position to a closed position in the event of an emergency such as a fire. In the normal operating condition, fusible element 81 is in a solid state and in operative relation to bore blocking means 93 and 95 within a slide collar 91. Orifices 96 and balls 95 hold shaft link 55 in its first position and thereby prevent movement of the actuator shaft 13 to hold valve gate 15 in its open position.

More particularly, fusible element 81 has bevel 83 abutting shoulder 57 of shaft link 55. Fusible element 81 also engages stop ring 85 which fixedly abuts ball support 93. Support 93 is held in place by one or more balls 95 spaced in one or more respective radial orifices 96 along the circumference of a cross-section of cylindrical body 51. The balls 95 are held in place by slidable collar 91 whose function is described in greater detail below.

In a heat responsive state, fusible element 81 melts. To allow shaft link 55 to move from its first position to its second position upon the melting of fusible element 81, shaft link 55 and ball support 93 are configured to allow axial movement of shaft link 55 free from obstruction by ball support 93.

Another important element of the invention is a mechanical release that can be operated either at the valve or remotely so as to enable operation of the actuated wellhead gate valve 10 between its open and closed positions even without melting fusible element 81. This allows normal operation of the actuated valve without requiring the removal of the cap assembly 50 from the actuator housing. Accordingly, an axial moving mechanical quick release feature is provided and in the preferred embodiment slide collar 91 is furnished for axial movement between a first position and a second position in relation to cylindrical body 51. In its first position, slide collar 91 has inner surface 97 engaging balls 95 to hold the balls 95 in the orifices 96 in cylindrical body 51 preventing movement of shaft link 55. Slide collar 91 is also provided with recess 99, which, when slide collar 91 is in its second position, allows for the balls 95 to move radially outwardly from orifices 96, allowing movement of shaft link 55 from its first position to its second position along with movement of the fusible element 81 and ball support 93. As can be appreciated from FIG. 3, ball support 93 has beveled portion 85 that, upon movement of the slide collar 91 into its second position, biases balls 95 outwardly as pressure from the actuator shaft 13 urges shaft link 55 from its first position to its second position.

The fusible manually operable lock-open cap assembly 50 is also provided with a top cover 101. Top cover 101 is rigidly attached, and may also be threadedly attached, to the cylindrical body 51 and, to avoid inadvertent valve closing, is employed as a support from which spring 103 biases slide collar 91 in its first position forcing balls 95 into bore 53 and preventing movement of link 55. Top cover 101 has a bore 108 through which the shaft link 55 may enter when the assembly moves to the second position from either excessive heat or mechanical release. However, bore 108 will not permit the ball support 93 or shaft link to pass through, thus retaining loose parts when the assembly moves to the second position.

For operation of slide collar 91, facilitating movement of shaft link 55 to allow actuator shaft 13 to close valve 10, slide collar 91 is shown with a lanyard 105 coupled thereto. Accordingly, upon pulling lanyard 105 from a remote position, such as with a cable 106 attached to lanyard 105, slide collar 91 can be moved from its first position to its second position compressing spring 103 and allowing balls 95 to be forced outwardly into recess 99, thus providing a mechanical quick-release feature to close valve 10 from a remote location and to allow normal operation of the gate valve 15.

As is also shown in FIG. 3, top cover 101 has one or more orifices 107 through which lanyard 105 may pass to engage collar 91.

A preferred embodiment of the invention has now been described in detail. It is to be noted, however, that this description of a specific embodiment is merely illustrative of the principles underlying the invention. It is contemplated that various modifications of the disclosed embodiment, without departing from the spirit and scope of the invention, will be apparent to persons skilled in the art.

What is claimed is:

1. An actuator shaft heat-sensitive locking apparatus comprising:
    a cylindrical housing with an axial bore;
    a shaft link in the bore movable axially between first and second positions;
    means movably extending through the housing partially blocking the bore;
    fusible element means slidably mounted in the bore between the shaft link and the bore blocking means, the fusible element having a solid state for preventing movement of the shaft link by engaging the bore blocking means and a heat responsive state for allowing movement of the shaft; and
    means surrounding the cylindrical housing and in operative association with the bore blocking means for axial movement between first and second positions such that, in its first position, the bore blocking means prevents movement of the shaft link and the fusible element and, in its second position, the bore blocking means moves out of the bore enabling the shaft to move with the fusible element to its second position.

2. An actuator shaft heat-sensitive locking apparatus comprising:
    a cylindrical housing having an axial bore;
    a shaft link in the bore movable axially between first and second positions;
    means movably extending through the housing partially blocking the bore;
    a fusible element slidably mounted in the bore between the shaft link and the bore blocking means, the fusible element having a solid state for preventing movement of the shaft link by engaging the bore blocking means and a heat responsive state for allowing movement of the shaft between the first and second positions; and
    mechanical release means surrounding the housing for axial movement and in operative relationship with the bore blocking means for operation from a remote distance to move the bore blocking means out of the bore enabling the shaft to move with the fusible element between the first and second positions.

3. Apparatus as in claim 2 wherein the means extending through the housing partially blocking the bore comprises:
    at least one orifice in the housing; and
    a ball inserted in the at least one orifice to partially block the bore and prevent movement of the shaft link.

4. Apparatus as in claim 3 further comprising a ball support structure interposed between the fusible element and the at least one ball for allowing only a portion of the at least one ball to extend into the bore a sufficient distance to restrict the bore.

5. Apparatus as in claim 4 where the remotely operated mechanical release means comprises:
    a ring positioned in surrounding relationship to the housing and slidably movable axially between first and second positions;
    a first part of the ring having a surface engaging the ball to hold the ball in the orifice when the ring is in its first position; and a second part of the ring having a recess to allow the ball to move out of the orifice and allow movement of the shaft when the ring is in its second position.

6. Apparatus as in claim 5 further including:
means coupled to the ring for enabling movement of the ring between its first and second positions; and
means coupled to the ring movement enabling means for moving the ring between its first and second positions from a location remote to the apparatus.

7. Apparatus as in claim 6 further including:
a second ring rigidly attached to the outer end of the housing; and
a spring positioned between the slidable ring and the rigidly attached second ring for urging the slidable ring to its first position to hold the at least one ball in the orifice and prevent movement of the shaft.

8. Apparatus as in claim 7 further comprising:
at least one orifice in the second ring; and
a lanyard passing through the at least one orifice in the second ring and attached to the movable ring for enabling the movable ring to move between its first and second position.

9. Apparatus as in claim 7 further including a second orifice in the second ring spaced from the first orifice, the lanyard being U-shaped to form a handle with the end of the extending through the first and second orifices for attachment to the movable ring such that pulling on the U-shaped handle moves the movable ring from its first position to its second to mechanically release the shaft link from its held position.

10. Apparatus as in claim 5 wherein the ball support structure has a sloping edge in contact with the ball to cam the ball outwardly from the orifice into the movable ring recess when the movable ring is moved to its second position.

11. Apparatus as in claim 7 further including a reduced bore in the second ring which prevents the release of the shaft link and ball support when the shaft moves to the second position from either excessive heat or mechanical release.

12. An actuator shaft heat-sensitive locking apparatus comprising:
a cylindrical housing having an axial bore;
a shaft link in the housing bore for axial movement between first and second positions;
at least one opening extending through the housing in communication between the bore and the exterior of the housing;
a ball positioned in the at least one opening;
retaining means slidably mounted in the bore adjacent the opening for allowing only a portion of the ball to extend into the bore a distance sufficient to restrict shaft link movement in the axial bore;
a slidable fusible element mounted between the retaining means and the shaft;
the fusible element having a solid state in which it is prevented from movement by the portion of the ball extending into the bore until the fusible element responds to heat; and
a ring positioned in surrounding relationship to the body and slidably movable axially from a first position for engaging the at least one ball to urge the ball in its position restricting the bore and preventing shaft link movement to a second position for releasing the at least one ball from its position restricting shaft link movement so as to allow the shaft to move from its first position to its second position.

13. Apparatus as in claim 12 wherein the axially slidable ring further comprises:
a first part of the ring having a surface engaging the ball to hold the ball in the opening when the ring is in its first position; and
a second part of the ring having a recess to allow the ball to move out of the opening and allow movement of the shaft when the ring is in its second position.

14. A lock-open assembly for attachment to an actuated gate valve assembly in operative association with a valve shaft protruding from the gate valve actuator assembly to lock the gate valve in the open position, if the actuator control pressure fails, while enabling the gate valve to be closed either by excessive heat or manual operation and comprising:
means for attaching the lock-open assembly to the gate valve actuator assembly;
a shaft extension held in the lock-open assembly for axial movement such that one end of the shaft extension abuts the actuator shaft protruding from the gate valve assembly when the valve is in the open position;
a slidable fusible link in the lock-open assembly for engaging the shaft extension;
means associated with the fusible link for preventing the shaft extension from axial movement in the lock-open assembly until the link melts from excessive heat; and
an axially slidable ring on the lock-open assembly having a first axial latch position and a second axial release position and coupled to the shaft extension for enabling the gate valve to be held in the open position when the axially slidable ring is in the first axial latch position and the actuator control pressure fails but enabling the gate valve to be operated in both its open and closed position when the axially slidable ring is in the second axial release position.

15. A heat-sensitive shaft locking apparatus for attachment to an actuated gate valve assembly to contact a gate valve actuator shaft protruding from the assembly and selectively hold the valve in its open position, the apparatus comprising:
a body member;
means adjustably coupling the body member to the gate valve actuator assembly for enabling the body member to be adjusted axially to contact the actuator shaft protruding from the gate valve actuator assembly;
a movable fusible element mounted in the body member and having a solid state in which the actuator shaft is engaged and prohibited from movement by the fusible element and a heat-sensitive fusible state allowing the actuator shaft to move and the valve to close; and
a manually operable assembly including means slidably coupled to the body member for axial movement between a first position in which the fusible element is prohibited from movement and a second position in which the fusible element is allowed to move with the actuator shaft to enable valve operation between its open and closed positions.

16. Apparatus as in claim 15 wherein the means for adjustably coupling the body portion to the gate valve actuator assembly comprises:
a sleeve attached to the gate valve assembly to receive the gate valve actuator shaft; and means for threadedly attaching the body member to the sleeve such that rotating the body member with respect to the sleeve moves the body member toward or away from the gate valve actuator shaft to enable the apparatus to be attached to any of a variety of gate valve actuator assemblies having actuator shafts of different lengths.

17. Apparatus as in claim 16 wherein the fusible element in its solid state is movable axially from a first position prohibiting movement of the actuator shaft and a second position allowing the actuator shaft to move and the valve to close.

18. Apparatus as in claim 17 wherein the manually operable assembly comprises:
retainer means associated with the body member and the fusible element for preventing movement of the fusible element from its first position to its second position; and
engaging means slidably coupled to the body member in operative relationship with the retainer means for selective manual axial movement between a first position causing the retainer means to engage the fusible element to prevent movement of the actuator shaft and maintain the gate valve open to a second position disengaging the fusible element and allowing movement of the actuator shaft to close the gate valve.

19. An actuator shaft heat-sensitive locking apparatus for attachment to an actuated gate valve assembly to engage a gate valve actuator shaft protruding from the assembly and selectively hold the valve in its closed position, the apparatus comprising:
a body portion attached to the gate valve actuator assembly;
a shaft extension in the body portion axially movable between first and second positions;
means for adjustably coupling the body portion to the actuator assembly such that the body portion can be moved toward the assembly until the shaft extension contacts the gate valve shaft;
retaining means associated with the body portion for preventing movement of the shaft extension from its first to its second position;
a slidable fusible element mounted between the retaining means and the shaft extension and having a solid state in which the retaining means prevents movement of the fusible element and the shaft extension and a fused state allowing movement of the shaft extension; and
manually operable means coupled to the body portion for axial movement between first and second positions to selectively cause the retaining means to engage and disengage the fusible element to prevent movement of the gate valve actuator shaft in its first position and allow movement of the gate valve actuator shaft in its second position.

* * * * *